W. T. SEARS.
ADJUSTING MECHANISM.
APPLICATION FILED MAR. 27, 1914.
1,122,649.
Patented Dec. 29, 1914.
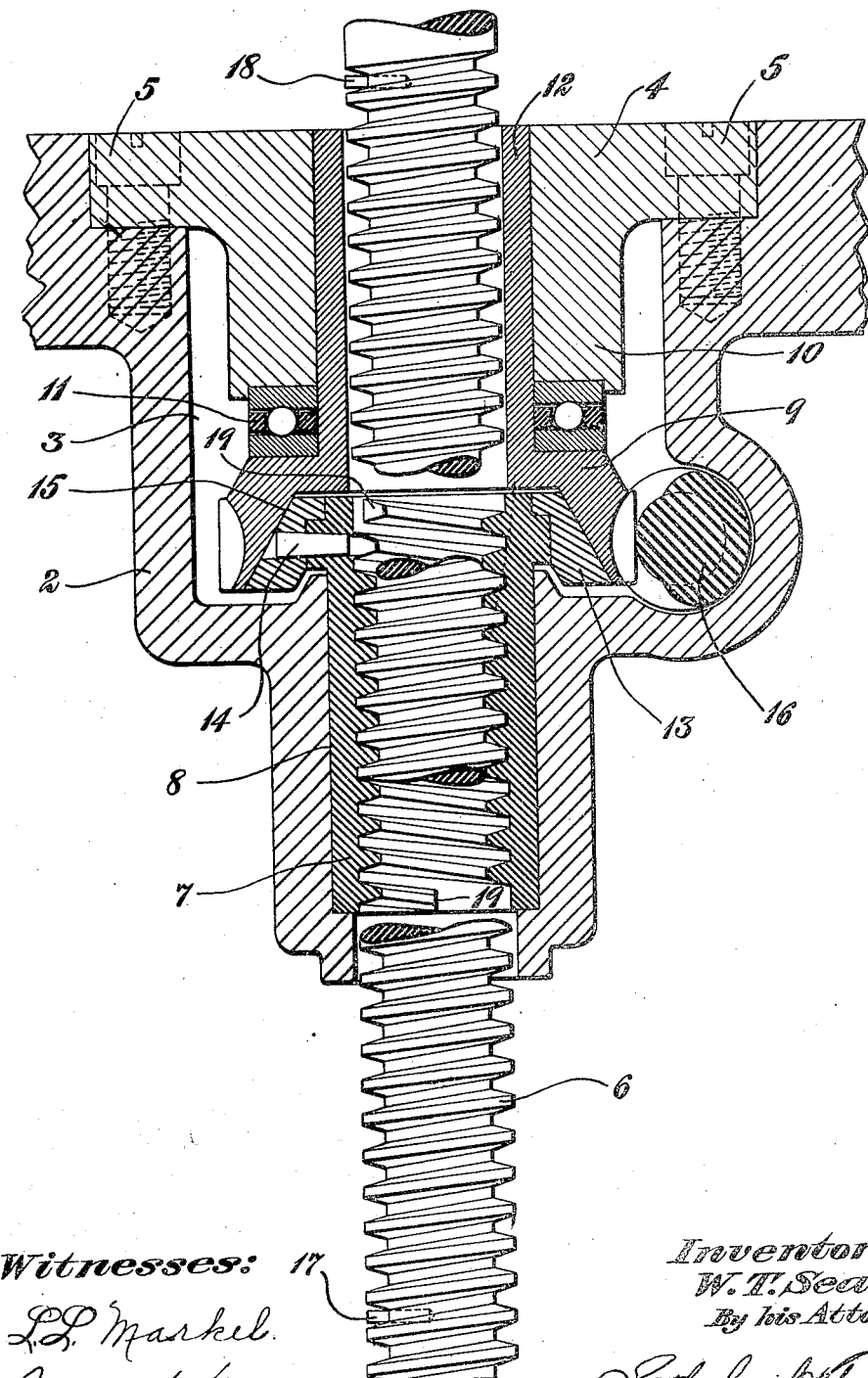
Witnesses:
L. L. Markel.
James H. Keane
Inventor:
W. T. Sears
By his Attorneys,
Sutherland & Anderson

UNITED STATES PATENT OFFICE.

WILLARD T. SEARS, OF PHILADELPHIA, PENNSYLVANIA, ASSIGNOR TO PRATT & WHITNEY COMPANY, OF HARTFORD, CONNECTICUT, A CORPORATION OF NEW JERSEY.

ADJUSTING MECHANISM.

1,122,649.     Specification of Letters Patent.     Patented Dec. 29, 1914.

Application filed March 27, 1914. Serial No. 827,572.

*To all whom it may concern:*

Be it known that I, WILLARD T. SEARS, a citizen of the United States, residing at Philadelphia, in the county of Philadelphia and State of Pennsylvania, have invented certain new and useful Improvements in Adjusting Mechanism, of which the following is a specification.

This invention relates to adjusting mechanism, the principal object of the invention being the provision of simple and effective means by which a support can be adjusted through the agency of a feed screw and nut, the construction being such that no injury can result to the parts should the support be inadvertently clamped in an adjusted position while the adjusting mechanism is in use.

The invention involves other points of novelty and advantage which with the foregoing will be stated at length in the following description, wherein I will set forth in detail that form of embodiment of the invention which I have selected for illustration in the drawing accompanying and forming part of the present specification, this showing being provided to enable those skilled in the art to practise the invention. I do not restrict myself to such disclosure; I may depart therefrom in several respects within the scope of the invention covered in the claims following said description.

In said drawing I have shown in transverse vertical section the arm of a radial drill and associated with this arm is a feed screw and nut for adjusting the same.

As will be inferred from the title given to the invention, the latter may be used in various connections, although it is of especial utility when incorporated in a radial drill such for instance as shown in Letters Patent No. 1,076,242 granted to me October 21, 1913 and to which reference may be had. In the drawing the numeral 2 denotes the arm of such a drill which arm presents a suitable support or carrier such as that to which I have already briefly alluded. In the case of a radial drill this support, carrier or arm is vertically adjustable and sustains the drill and certain other adjuncts which constituting no part of the present invention need not be illustrated and described herein. As shown the arm 2 has a chamber 3 covered by the cap or plate 4 removably held in place by several screws as 5. In a radial drill the arm 2 is raised and lowered by a feed screw and coöperating nut, the screw being non-rotative and immovable in the direction of its longitudinal axis. The numeral 6 denotes such a feed screw and so far as its mounting and feeding functions are concerned, it is exactly like that shown in the patent to which I have referred. This feed screw 6 extends entirely through the adjustable arm 2 and also through a nut as 7 therein, the threads of the nut, as will be inferred, corresponding with those of the feed screw. Said nut is mounted for rotation in the socket 8 opening into the chamber 3 to which I have already referred, and it may be operated in any desirable manner for example by the worm gear 9 rotatively mounted in said chamber 3. In the present case, however, and as will hereinafter appear, the effect of the worm gear 9 is not directly applied to the nut. The nut as will hereinafter appear is immovable in the direction of its axis of rotation with respect to the supporting arm 2. It, therefore, follows that when the worm gear 9 is turned the nut 7 will be correspondingly rotated to effect the adjustment of the support 2 in the direction of the length of the screw 6. Between the body of the worm gear 9 and the depending hub 10 of the plate 4 the anti-friction bearing 11 serving its usual function may be interposed, the elongated hub 12 of said worm gear being rotatively disposed in said hub 10. I provide for a slip connection between the worm gear 9 or equivalent operating member, and the nut 7 and for this purpose the approximately conical element 13 is shown, said conical element 13 surrounding the upper side of the nut 7 and being pinned or otherwise suitably connected therewith; the pin 14 however, is shown for such purpose. The conical member 13 is disposed in the conical socket or seat 15 in the under side of the worm gear 9, the cone or taper faces of these two parts being constantly in contact, and there being sufficient frictional engagement between the two to insure that the arm 2 will be adjusted on the rotation of the worm gear 9 or equivalent device. Should, however, the arm 2 be clamped in an adjusted position and should the worm gear 9 be turned, no injury can result as the worm gear will slip over the cone element 13 without accomplishing anything. To operate the worm gear the worm 16 supported in the chamber 3, may be provided. This worm 16 may be rotated by hand or power. The materials of which the worm gear 9, nut 7, and cone element 13 are made are not a matter of consequence. Usually, however, the worm wheel and nut are made of brass, while the part 13 is made of steel.

I provide means for positively arresting the movement of the arm 2 at the ends of its traverse, and any suitable stop means may be provided and although duplicated, this is not always necessary. It will be clear that when the arm is stopped at the extreme end of its movement in either direction and that if the worm gear 9 be still turned, no injury can result, in that the said worm gear rides idly over the conical element 13. The means for stopping the arm 3 are preferably carried by the feed screw 6 and as shown consist of stop pins 17 and 18. As shown these pins are at right angles to the longitudinal axis of the feed screw and are driven into holes extending inward from the bottom of the grooved portion of the thread of said feed screw. It will be noted that the terminal portions of the thread of the nut 7 are squared off as at 19, and this in itself is advantageous, in that the squared end surfaces of said thread abut squarly against the respective pins without any wedging action whatsoever. From the observations already made, it will be clear that there is to all intents and purposes a friction clutch between the operating member 9 and the feed nut 7. This is only one type of clutch; there are others that I might employ with equal advantage. I desire to call attention to the fact that there is an advantage in squaring off the terminals of the thread of the nut as shown at 19, in that the arm 3 is properly arrested, that is without any wedging action. I desire to call attention to the fact that the weight of said arm 2 and the parts on said arm is sustained by the said friction clutch and thereby the engaging surfaces of said clutch. In the construction shown the feed screw is fixed, the nut being rotary. This as will be inferred, is not essential, the adjusting mechanism comprising broadly a feed screw and a nut regardless of the manner in which they are related for relative rotation.

What I claim is:

1. The combination of a support, adjusting mechanism for said support, consisting of a nut and a feed screw, an operating member for the adjusting mechanism, friction clutch means for transferring the effect of the operating member to the adjusting mechanism, and means for positively arresting the movement of the support at a predetermined point, the adjusting mechanism and operating member being capable of relative rotation after said support is arrested.

2. The combination of an arm, a feed screw, a nut rotatively supported by the arm and immovable with respect thereto in the direction of its axis of rotation, said feed screw being immovable in the direction of its axis of rotation and non-rotary, an operating member for the nut, and friction clutch means disposed between the nut and said operating member.

3. The combination of an arm, a feed screw, a nut rotatively supported by the arm and immovable in the direction of its axis of rotation, said feed screw being co-operative with the nut and being immovable in the direction of its axis of rotation and non-rotary, an operating member for the nut, friction clutch means disposed between the nut and the operating member, and stop means on the feed screw for engaging the nut to positively arrest the movement of the arm at predetermined points.

4. The combination of a support, adjusting mechanism for said support, consisting of a nut and a feed screw, an operating member for the adjusting mechanism, friction clutch means for transferring the effect of the operating member to the adjusting mechanism, a stop on the feed screw, a terminal of the threaded portion of the nut being squared off and being engageable by said stop.

5. The combination of a support, adjusting mechanism for said support, consisting of a nut and a feed screw, an operating member for the adjusting mechanism, friction clutch means for transferring the effect of the operating member to the adjusting mechanism, and pins driven into the grooved portion of the feed screw near the ends thereof extending at right angles to said feed screw, the terminals of the nut being squared off and being adapted to be engaged by said pins when the support reaches the opposite ends of its movements.

6. The combination of a support, adjusting mechanism for said support, comprising a nut and a feed screw, and a stop on the feed screw, a terminal of the threaded portion of the nut being squared off and being engageable by said stop.

7. The combination of a support, adjusting mechanism for said support, consisting of a nut and a feed screw, an operating member for the adjusting mechanism, friction clutch means for transferring the effect of the operating member to the adjusting mechanism, and means for preventing relative rotation of the nut and the feed screw at a predetermined point.

8. The combination of a support, adjusting mechanism for said support, comprising a nut and a feed screw, an operating member for the adjusting mechanism, friction clutch means for transferring the effect of the operating member to the adjusting mechanism, and means for preventing relative rotation of the screw and the nut at predetermined points in opposite adjustments.

9. The combination of a support, adjusting mechanism for the support comprising a nut and a feed screw, an operating member for the adjusting mechanism, and friction clutch means for transferring the effect of the operating member to the adjusting mechanism, the friction clutch means sustaining said support.

10. The combination of a support, adjusting mechanism for said support comprising a nut and a feed screw, an operating member for the adjusting mechanism, and friction clutch means inclosed by and sustaining said support, said friction clutch means being adapted to transfer the effect of the operating member to the adjusting mechanism.

11. The combination of a support, adjusting mechanism for said support comprising a nut and a feed screw, an operating member for the adjusting mechanism, means for positively arresting the movement of the support at a predetermined point, and means for transferring the effect of the operating member to the adjusting mechanism and for permitting relative movement of the adjusting mechanism and operating member when said support is arrested.

12. The combination of a support, adjusting mechanism for said support, comprising a nut and a feed screw, an operating member for the adjusting mechanism, friction clutch means for transferring the effect of the operating member to the adjusting mechanism, a stop on the feed screw, the nut having a stop and the two stops coöperating to prevent relative rotation of said feed screw and nut at a predetermined point.

13. The combination of a support, adjusting mechanism for said support comprising a nut and a feed screw, an operating member for the adjusting mechanism, friction clutch means for causing relative rotation of the screw and the nut, and stops disposed at fixed points for overcoming the resistance of the friction clutch means and preventing relative rotation of the feed screw and the nut.

In testimony whereof I affix my signature in presence of two witnesses.

WILLARD T. SEARS.

Witnesses:
C. R. FOUNTAIN,
DAVID T. NEVIN.